April 1, 1952     E. A. O'BRIEN     2,591,000

RETRACTABLE FLAP SUPPORT

Filed Sept. 14, 1949     2 SHEETS—SHEET 1

Edward A. O'Brien.
*INVENTOR.*

BY *James M. Clark*

HIS PATENT ATTORNEY.

April 1, 1952        E. A. O'BRIEN        2,591,000

RETRACTABLE FLAP SUPPORT

Filed Sept. 14, 1949        2 SHEETS—SHEET 2

Edward A. O'Brien
*INVENTOR.*

BY

HIS PATENT ATTORNEY.

Patented Apr. 1, 1952

2,591,000

UNITED STATES PATENT OFFICE 2,591,000

RETRACTABLE FLAP SUPPORT

Edward A. O'Brien, Redondo Beach, Calif., assignor to North American Aviation, Inc.

Application September 14, 1949, Serial No. 115,719

16 Claims. (Cl. 244—42)

The present invention relates in general to the wings of aircraft and more particularly to improvements in the mounting and support of flaps and other movable components associated with aircraft wings and like structures.

In the mounting and support of movable surfaces, such as flaps and the like, upon aircraft wings, it is frequently desirable to have a pivot for the movable surface located considerably below and aft of the rear spar or other structural member of the wing. The attendant drag or resistance which results from extending a surface mounting into the airstream at such distances from the main wing under-surface frequently precludes the possibility of using such an arrangement. The present invention is directed to an improved foldable or retractable mounting or support for such movable surfaces which is fully retractable when not in use to thereby eliminate any drag during high speed or cruising flight and accordingly eliminates all of the objectionable results inherent in such fixed supports for movable surfaces which have been proposed and used heretofore. The present invention consists essentially of a foldable and separable mounting which may be in the form of a hinge bracket assembly part of which is journalled and supported by the relatively fixed wing and the other part attached to and journalled within the movable flap or other component. These hinge bracket portions are journalled upon a separable shaft or pivot about which the hinge bracket assembly may be rotated into its extended position at which it carries the flap hinge at an appreciable distance below the wing surface and about which pivot the flap may be rotated. The separable pivot about which the hinge bracket assembly rotates is provided with self-alignment portions and a slotted retaining means which holds or locks the bracket portions together when the assembly is in the retracted position. Inasmuch as the flap is extended only during landing and take-off operations, or at times when the relative air speeds are low, the drag effects of the extended hinge bracket are negligible and not objectionable.

It is, accordingly, a major object of the present invention to provide an improved mounting for a wing flap or other aircraft component. A further objective resides in the provision of a hinge bracket assembly for a movable surface a portion of which assembly is journalled for rotation upon the fixed wing and the remaining portion journalled for rotation upon the flap or other movable surface. It is a corollary objective of the present invention to provide a projectible and retractable pivotal mounting for a movable component which pivotal mounting is fully retractable within the profile of the wing when the mounting is not in use. It is a further object to provide an improved hinge bracket assembly in which the flap pivot is extendible to a position appreciably beneath the wing surface and the alignable bracket hinge portions are separable to permit unfolding of the hinge assembly during extension of the flap. It is a further object to provide such a hinge pivot for a swingable bracket in which the separable pivot portions can be re-aligned and automatically locked in axial relationship upon retractive swinging of the bracket about its rotative axis. Further objects of the present invention reside in the improved arrangement of the retractable flap support and the details of the respective elements as well as their cooperative relationship.

Other objects and advantages of the present invention will become apparent to those skilled in the art after reading the following description taken in conjunction with the accompanying drawings forming a part hereof, in which.

Figure 1:
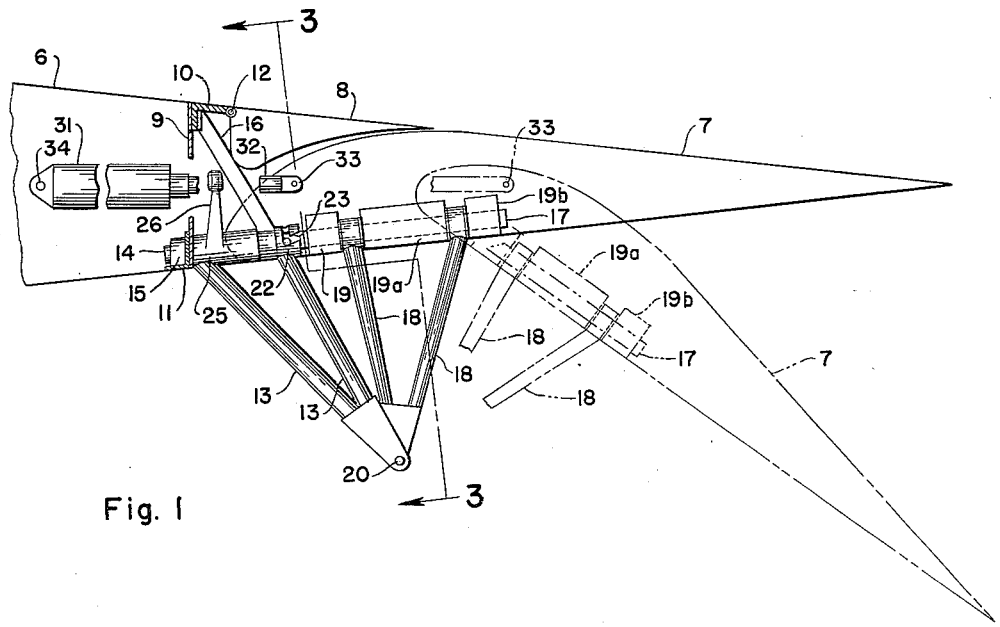
Fig. 1 is a sectional elevational view of a trailing portion of a wing from which a flap is supported by a form of the present retractable hinge support.

A relatively fixed wing 6 has operatively associated with its trailing edge a hinged flap 7 and an auxiliary hinged surface element 8. The wing 6 is provided with a spanwise extending trailing edge spar or similar structural member 9 having a top chord angle 10 and a bottom chord angle 11. The hinged element 8 is pivotally mounted upon the chord element 10 by the hinge 12 such that the element 8 can be rotated in the counterclockwise direction as the flap 7 is rotated downwardly and rearwardly in the clockwise direction for improvement of the air flow through the slot created between the trailing edge of the wing and the leading edge of the flap 7. It will be understood, however, that the hinged element 8 is merely incidental to the type of flap which has been selected for the present description and that the present invention is applicable to other types of flaps than that shown which may or may not have associated therewith elements of the type of the surface 8.

Figure 3:
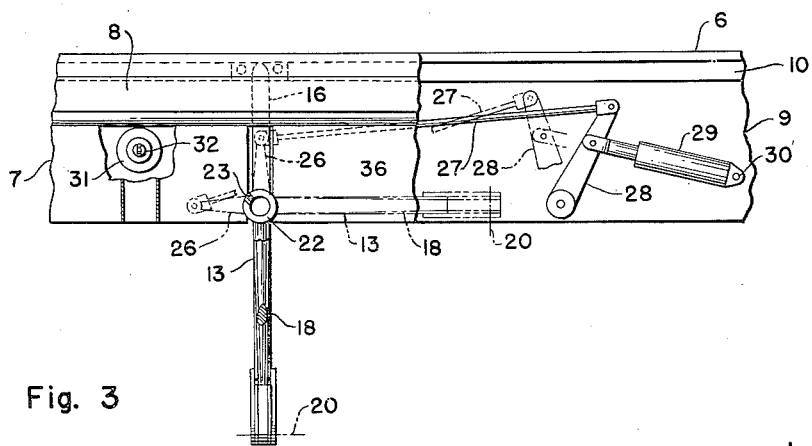
Fig. 3 is a rear elevational view of the assembly shown in the foregoing figures.

A triangular framework is formed by the two outwardly converging struts 13 which are separated at their diverging inner terminals for journalling about a preferably fixed hinge bracket pivot 14. The pivot shaft 14 is fixedly supported at its forward portion by means of the bearing fitting 15 fixedly attached to the chord element 11 and the shaft 14 is also supported adjacent its rear terminal by the depending bracket fitting 16 which is secured to the top chord 10 of the spar 9. The bracket hinge shaft 14 is preferably fixedly mounted within the fittings 15 and 16 upon a generally chordwise-extending axis about which the triangular strut framework 13 is adapted to be rotated through approximately 90° from its extended position shown in full lines in Figs. 1, 2, and 3 to its retracted position as shown in construction lines in Fig. 3 in which it lies within the airfoil contour formed by the fixed wing 6 and its flap 7. The bracket hinge shaft 14 has a rearwardly aligned counterpart shaft 17 which forms the pivot for a similar triangular strut framework formed by the two outwardly converging struts 18, the shaft portion 17 being fixedly supported within the lower portion of the flap 7 by the fittings 19, 19a and 19b. The triangular strut frames 13 and 18 which individually converge at their outer extremities, also converge with each other at the pivotal connection 20 which forms the pivotal mounting for the movable flap 7. The hinge axis 20 in the extended position shown in Fig. 1 extends horizontally, normal to the fore and aft vertical chordwise-extending plane within which lie the axes of the bracket hinge pivot portions 14 and 17.

It will, accordingly, be understood that, in the position shown in Fig. 1, the hinge pivots 14 and 17 forming the base of the combined triangular framework may be separated such that the converging strut 13 supports the extended pivot 20 about which the converging struts 18 are permitted to rotate for the support of the downwardly and rearwardly moving flap 7. While the bracket base pivot portions 14 and 17 are appreciably separated in the extended position of the flap 7 as shown in the construction lines in Fig. 1 their axes continue to remain in the same plane normal to the horizontal axis of the flap pivot 20. When the flap is again retracted, however, and alignment of the hinge pivots 14 and 17 is again restored, the converging strut frames 13 and 18 may be rotated or swung about the axis of the aligned and connected pivots 14 and 17 into the retracted position shown in the construction lines in Fig. 3 in which the axis of the flap pivot 20 assumes a substantially vertical position, or at least is substantially normal to the under-surface of the wing 6, and its retracted flap 7, and is spaced from and normal to the aligned axes of the bracket pivots 14 and 17.

Figure 4:
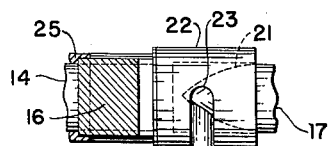
Fig. 4 is a detailed plan view of the separable pivot terminals and the retaining means for the separable portions.
Figure 5:
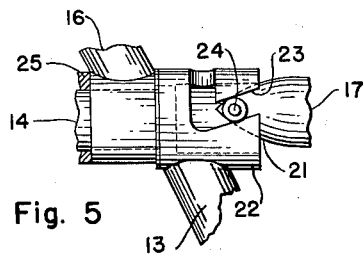
Fig. 5 is an elevational view of the same.

Referring now to the details shown in Figs. 4 and 5, it will be noted that the swingable pivot portion 17 is provided with a pointed tip or terminal 21 which is adapted to be guided into the fitting 22 which is provided with an angularly disposed slot 23 conforming to the arcuate path of 21 about the flap pivot 20. A laterally extending roller 24 is pivotally mounted adjacent the tip portion 21 of the pivot shaft 17 to facilitate its entry within the mouth of the angular slot 23 and its retention within the fitting 22 by the transverse portion of this slot. The fitting 22 is fixedly attached to the aft strut 13 of the forward pair for which it forms a hub portion and with which the strut 13 is adapted to be rotated about the axis of the aligned pivots 14 and 17. The forward strut 13 of the wing-carried pair is similarly provided with a hub portion 25 which is suitably bored to be pivotally mounted upon the pivot 14, the hub portion 25 being provided with an integral upstanding arm 26 by means of which the triangular bracket assembly 13—18 can be rotated for extension and retraction about the aligned axes of the pivots 14 and 17.

The retractable bracket assembly 13—18 is rotated about its pivotal axis of the shaft 14—17 by engagement of the push-pull rod 27 with the arm 26, the rod 27 being pivotally connected to the outer terminal of the lever 28. The lever 28 is in turn rocked about its pivotal mounting by the actuating motor 29 pivotally mounted at 30. It will, accordingly, be seen that extension of the piston portion of the fluid motor 29, as shown in the full lines in Fig. 3, will impart counterclockwise movement to the crank or lever 28 imparting translation toward the left of the push-pull rod 27, and corresponding movement of the arm 26 in the counterclockwise direction causing retraction of the bracket assembly 13—18 from its full line position in which the flap pivot 20 extends appreciably beneath the wing 6, into the retracted position in which the entire flap hinge support is retracted within the profile of the combined wing 6 and its retracted flap 7, the extended flap being omitted from Fig. 3 for purposes of clarity.

The hinged flap 7 is actuated about its extended pivot 20 by means of the fluid motor 31 having a piston portion 32 the outer terminal of which is pivotally connected at 33 to a point upon the leading edge portion of the flap 7. The fluid motor 31 is pivotally mounted for rocking movement upon the pivot 34 supported upon the fixed wing portion 6 and when the flap hinge 20 is in its extended full line position of Fig. 1, rearward movement of the piston portion 32 imparts rearward and downward rotation to the flap 7 about its pivot 20 into its "down" position as shown in the construction lines in Fig. 1. When the flap has again been retracted into the full line position in which the axes of the bracket pivots 14 and 17 are again aligned and the roller 24 is positioned within the corner of the angular slot 23 in the fitting 22, the arm 26 may be rotated for retraction of the hinge bracket assembly 13—18 into its retracted position in which the pin or roller 24 is retained within the transverse portion of the slot 23 of the fitting 22 to prevent any separation of the pivot portions 14 and 17 while the hinge bracket is in its retracted position.

Figure 2:
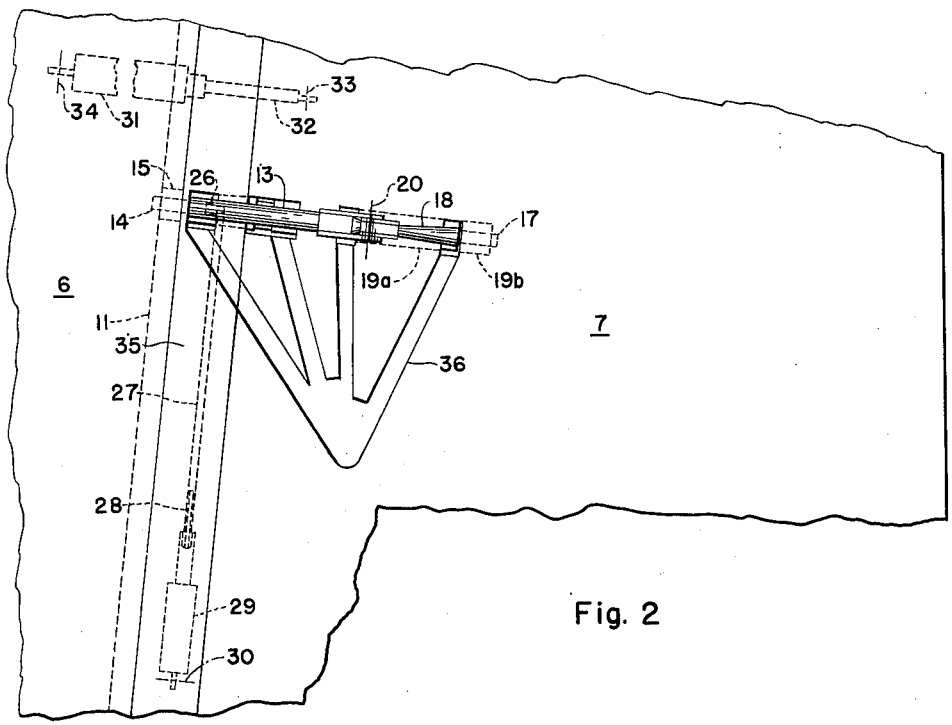
Fig. 2 is a bottom plan view of the wing, flap and hinge support shown in Fig. 1.

The gap between the lower chord angle 11 of the spar 9 and the leading edge of the flap 7, as more particularly shown in the bottom view in Fig. 2, may be faired in flush with the fairing sheet portion 35 which forms a flush and continuous undersurface of the wing with the undersurface of the flap in its retracted position. Both the undersurface of the flap 7 and the fairing portion 35 are preferably provided with a recessed portion 36 within which the folded and retracted bracket assembly 13—18 may be housed in a flush streamlined condition in order to reduce its drag or resistance in the high speed or cruising condition of the retracted flap.

Suitable sequence mechanism may preferably be provided to prevent actuation of the flap extension motor 31 while the hinge bracket assembly 13—18 is in its retracted position and also to insure retracting movement of the flap prior to retraction of the hinge bracket assembly. It will accordingly be seen that a rigid flap support and pivot is provided at an appreciable distance aft of the rear spar of the fixed wing and also considerably below the lower surface of the wing and its associated flap, which flap pivot is fully retractable to a position within the combined contour of the wing and its flap. With the hinge bracket and support extended only in the low speed conditions in which the flap is to be extended, the drag or resistance caused by the extended bracket assembly is not objectionable. It will be understood that while but one retractable hinge bracket has been shown and described, at least two or more would normally be provided for an actual flap installation, and that it may similarly be desirable to provide either a single power source for the extension and retraction of the hinge bracket or means for insuring their substantially synchronous operation. In the case of long span flaps, it may also be desirable to provide a plurality of flap actuating motors which, of course, can also be other than the fluid-actuated type shown and described herein by way of example only.

Other forms and modifications of the present invention both with respect to its general arrangement and the details of its several parts, which may occur to those skilled in the art after reading the foregoing description are all intended to come within the scope and spirit of the present invention as more particularly set forth in the appended claims.

I claim:

1. In aircraft including a wing and a flap, retractable hinge means for the pivotal support of said flap from said wing including a pair of relatively separable members each forming a triangular frame having aligned base portions separately pivoted upon a common axis upon said wing and said flap, a flap hinge carried by converging portions of said members forming an apex of said triangular frames, means for rotating said frames about the axis of said aligned base portions for the extension of said flap hinge and means for rotating said flap into an extended position about the axis of said flap hinge by the separation of said frame base portions.

2. In aircraft including a wing and a flap, retractable hinge means for the pivotal support of said flap from said wing including a pair of relatively separable members forming a triangular frame having aligned base portions separately pivoted upon said wing and said flap, a flap hinge carried by converging portions of said members forming an apex of said triangular frame, said aligned base portions having a common axis, means for rotating said frame about the axis of said aligned base portions for the extension of said flap hinge, means for rotating said flap, and means for locking said base portions together initiated by retractive movement of said triangular frame by said frame rotating means.

3. In an aircraft, a wing, a flap, a first pivot means carried by a trailing portion of said wing, bracket means pivotally mounted for rotation about said pivot means, second pivot means carried by said flap, said first and second pivot means extending chordwise of said wing and lying within the profile of said wing, second bracket means pivotally mounted for rotation about the axis of said second pivot means, further pivot means interconnecting converging ends of both said bracket means remote from said pivotal mountings upon said wing and said flap, means to extend and retract said flap about said further pivot means and means to rotate both said bracket means about said first and second pivot axes for retraction of said bracket means.

4. In an aircraft, a wing, a flap operatively carried by the trailing edge of said wing, pivot supporting means rotatively mounted upon the trailing portion of said wing, flap supporting means pivotally mounted upon said flap, a flap pivot pivotally interconnecting adjacent portions of said pivot supporting and flap supporting means, means for rotating said pivot supporting means and said flap supporting means between a retracted and an extended position at which said flap pivot is disposed beneath the undersurface of said wing and said flap, and actuating means for extending and retracting said flap about said extended flap pivot.

5. In aircraft, a wing, a flap, pivot means having a forward portion supported by said wing and an aft portion attached to said flap, said forward and aft portions of said pivot means being relatively separable, bracket means pivotally mounted upon said forward pivot portion, further bracket means pivotally mounted upon said aft pivot portion, a pivotal interconnection between said bracket means spaced from said pivot means and forming a pivot for said flap, means for rotating said pivotally interconnected bracket means about said pivot means between a retracted position and an extended position beneath the undersurface of said wing and flap, and means to project said flap rearwardly and downwardly about the axis of said flap pivot and supported therefrom by said second bracket means.

6. In an aircraft, a wing, a flap operatively supported from the trailing edge of said wing, pivot supporting means rotatively mounted upon the trailing portion of said wing, flap supporting means pivotally mounted upon said flap, a flap pivot pivotally interconnecting adjacent portions of said pivot supporting and flap supporting means, means for rotating said pivot supporting means and said flap supporting means between a retracted and an extended position at which said flap pivot is disposed beneath the undersurface of said wing and said flap, actuating means for extending and retracting said flap about said extended flap pivot, and means for locking said pivot supporting means and flap supporting means together initiated by retraction of said pivot supporting means and flap supporting means.

7. In aircraft, a relatively fixed wing, a movable surface operatively carried by said wing, first support means pivotally mounted upon said fixed wing, second support means pivotally mounted upon said flap, said first and second support means defining a pair of pivotal mountings having a common axis, said first and said second support means pivotally connected to each other upon a pivot axis spaced from the common axis of said pivotal mountings, means for rotating both said support means about their pivotal mountings for the extension of said pivotal connection into an operative position beneath said wing, and further means for moving said flap and said second support means about said pivotal connection for movement of said flap downwardly and rearwardly with respect to said wing into an operative position of said flap.

8. In aircraft, a wing, a movable surface carried by said wing, first support means pivotally mounted upon said wing, surface support means pivotally mounted upon said surface, both said support means mounted upon an aligned pivot axis extending chordwise of said wing, pivot means interconnecting said first support means and said surface support means, means for rotating said first support means and said surface support means between retracted and extended positions, and means for moving said surface and said surface support means about said pivot means in the extended position of said surface support means.

9. In aircraft, a relatively fixed wing, a movable surface, retractable hinge means for the pivotal support of said surface from said wing including a pair of separable support members each forming a support frame having separable base portions separately pivoted upon alignable chordwise axes upon said wing and upon said surface respectively, a surface hinge carried by remote portions of said support members, means for rotating said support frame about the aligned axis of said base portions while said surface is in its retracted position for the extension of said surface hinge to a position beneath said wing and said surface, and means for rotating said surface about the axis of said surface hinge by the separation of said support frame base portions into an extended operative position of said movable surface.

10. In an aircraft, a wing, a movable flap, and a retractable pivotal mounting for said flap comprising a first support member rotatably mounted upon a chordwise axis upon said wing, a second support member rotatably mounted upon said flap, a flap pivot pivotally interconnecting adjacent portions of both said support members remote from said rotatable mountings, means for rotating both said support members concurrently between retracted and extended positions, locking means for retaining said rotatably mounted portions of both said support members together, and automatic means actuated by the rotation of both support members into said extended position for unlocking said locking means to permit the movement of said flap into its operative position by rotation about said flap pivot.

11. The combination with a relatively fixed wing and a flap operatively carried by the trailing portion of said wing, of a retractable flap support assembly pivotally mounted on said wing upon a chordwise axis for lateral movement spanwise of said wing between retracted and extended positions with respect to said wing and said flap, said flap support assembly arranged to support said flap for chordwise movement with respect to the trailing edge of said wing.

12. In an aircraft wing installation, a relatively fixed wing, a movable surface, pivot means including a forward portion supported by said wing and an aft portion attached to said surface, said portions of said pivot means disposed in chordwise alignment arranged for axial separation of said forward and aft portions, bracket means including elements separately pivotally mounted upon each portion of said pivot means, and a pivotal interconnection joining the elements of said bracket means and about which pivotal interconnection said surface is arranged to be rotated for movement in the chordwise direction in the separated condition of the forward and aft portions of said pivot means, the relative pivotal movement of one of said portions with respect to the other said portion producing rotation of said surface with respect to said wing.

13. In aircraft, a wing, a movable surface carried by said wing, first support means pivotally mounted upon said wing, surface support means pivotally mounted upon said surface, both said support means disposed upon pivot axes extending chordwise of said wing, transverse pivot means interconnecting said first support means and said surface support means, means for rotating said first support means and said surface support means in a transverse direction about said aligned chordwise axes between retracted and downwardly extended positions with respect to said wing and said surface, and means for moving said surface and said surface support means in a chordwise direction about said transverse pivot means in the said downwardly extended position of said surface support means.

14. In an aircraft, a wing, a surface, and a retractable pivotal mounting for said surface comprising a member rotatably mounted upon a chordwise extending axis upon said wing, a second member rotatably mounted upon a chordwise extending axis upon said surface, a surface pivot pivotally interconnecting converging portions of both said members, means to rotate both said members concurrently between retracted and extended positions with respect to said wing and said surface, means for extending and retracting said surface and the said second member in the generally chordwise direction with respect to said wing and about said extended surface pivot, and means for locking said members together in the retracted position of said surface initiated by retraction of said members about said chordwise axis.

15. The combination with a relatively fixed wing and a flap operatively carried by the trailing portion of said wing, of a support assembly including a pair of relatively rotatable elements pivotally mounted upon a chordwise axis disposed entirely within the profile of said wing and said flap, pivotal means disposed on a transverse axis carried by a first of said elements for the relatively rotatable pivotal support of the second of said elements of said support assembly, the axis of said pivotal means spaced from the said pivotal mounting of said support assembly for the pivotal support of said flap by said second element, means for extending and retracting said support assembly in the transverse direction, and means for extending said flap in the chordwise direction into an operative position about said pivotal means and with respect to said wing.

16. In aircraft, a relatively fixed wing, a movable surface operatively mounted upon the trailing portion of said wing, a surface mounting comprising a first member pivotally mounted upon said wing upon a chordwise axis, a second member movably mounted upon said first member, said surface pivotally mounted upon said second member upon an axis alignable with the chordwise axis of said first member, the alignment of the axes of the pivotal mountings of said first and second members determined by the relative position of said second member with respect to said first member upon which it is movably mounted, means to extend and retract both said first and second members about said chordwise axis in the aligned positions of the pivotal mountings, and means cooperating with the movable mounting of said second member upon said first member for extending and retracting said surface with respect to said wing.

EDWARD A. O'BRIEN.

REFERENCES CITED

The following references are of record in the file of this patent:

UNITED STATES PATENTS

| Number | Name | Date |
|---|---|---|
| 1,837,186 | Alfaro | Dec. 22, 1931 |
| 1,890,012 | Alfaro | Dec. 6, 1932 |
| 2,218,114 | Kunze | Oct. 15, 1940 |
| 2,278,562 | Raymond | Apr. 7, 1942 |
| 2,542,792 | Bennett et al. | Feb. 20, 1951 |